(No Model.)

R. M. HUNTER.
INSTRUMENT FOR MEASURING ELECTRIC CURRENTS.

No. 570,481. Patented Nov. 3, 1896.

Attest:
H. L. Motherwell
C. M. Dutterich

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

INSTRUMENT FOR MEASURING ELECTRIC CURRENTS.

SPECIFICATION forming part of Letters Patent No. 570,481, dated November 3, 1896.

Application filed October 4, 1892. Serial No. 447,790. (No model.)

*To all whom it may concern:*

Be it known that I, RUDOLPH M. HUNTER, of the city and county of Philadelphia, and State of Pennsylvania, have invented Improvements in Instruments for Measuring Electric Currents, of which the following is a specification.

My invention has reference to electric meters; and it consists of certain improvements which are fully set forth in the following specification and shown in the accompanying drawings, which form a part thereof.

This application, Case No. 229, has particular reference to electric meters for measuring volts and amperes, and is specially adapted as a voltmeter for central-station work or laboratory use.

In carrying out my invention I provide a wire under tension through which a small current is caused to flow, and said wire in its expansion and contraction acts upon a pivoted needle or pointer which is made to traverse a scale. The scale is supported upon or connected in any suitable manner to an expansible arm or support, whereby it is movable bodily under the needle or pointer, so that for any direction of movement of the needle for changes in the atmospheric temperature the scale will move also.

I further make the instrument dead-beat by employing a glycerin-cup, in which a paddle connected with the pointer is caused to move. The said paddle passing sluggishly through the liquid prevents any sudden movements or vibrations of the needle or pointer.

The construction of my meter will be better understood by reference to the accompanying drawings, in which—

Figure 1:
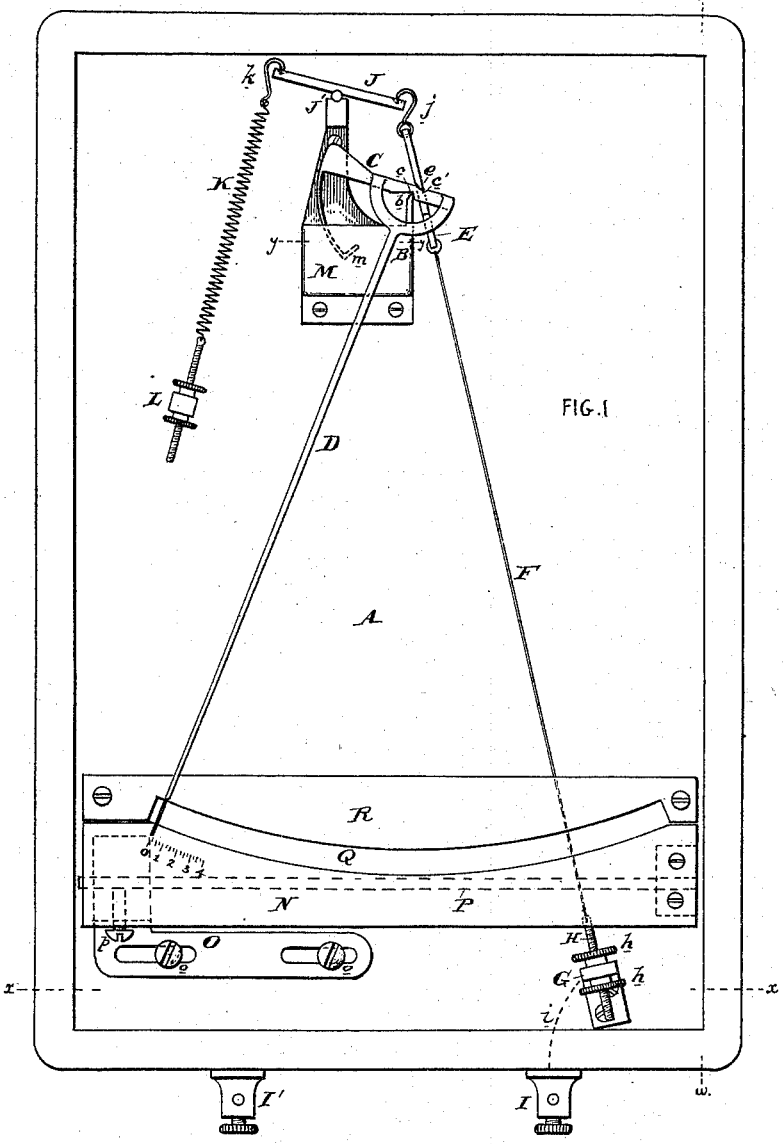
Figure 3:
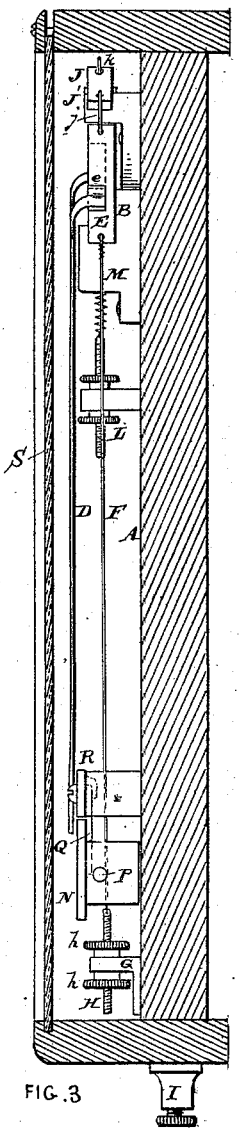
Figure 2:
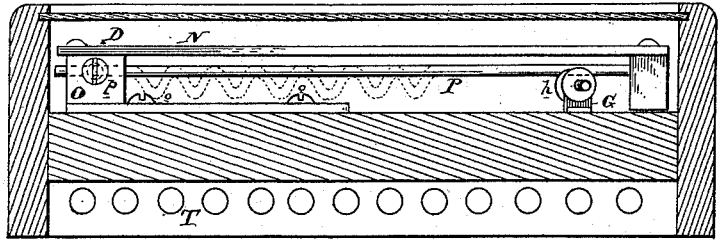
Figure 4:
Figure 5:
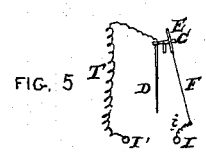

Figure 1 is a front elevation of the meter. Fig. 2 is a cross-section of the same on the line $xx$. Fig. 3 is a sectional elevation of the same on line $ww$. Fig. 4 is a cross-section of the glycerin-cup and paddle on the line $yy$, and Fig. 5 is a small diagram of the circuits of the meter.

B is a fulcrum secured to the frame A, and has a knife-edge $b$, preferably beveled in one direction only.

C is a pivoted fulcrum-block having the needle or pointer of aluminium, and is provided with the notches $c$ $c'$ upon opposite sides. The notch $c$ receives the knife-edge $b$ of the fulcrum B. The knife-edge $e$ of the plate E is received in the notch $c'$ of the fulcrum-block C. The plate E and the fulcrum-plate B are slightly separated, so as to prevent any possibility of friction. The plate E is connected to one end of an expansion-wire F, of platinum, German silver, or any suitable composition metal, the lower end of which is secured to a screw H and adjustably fastened to an abutment G in the case A by nuts $h$. The upper part of the plate E is connected by a hook $j$ with a lever J, fulcrumed at J', and having its other end connected by a hook $k$ with a spring K, the tension of which may be adjusted by a device L similar to the adjustable connection G H $h$ for the wire F.

The spring K keeps the wire F and plate E under tension. The wire F in expanding permits the plate E to rise, and thus releases the fulcrum-block C of the pointer D, so that by gravity it swings upon the fulcrum-point B and the pointer traverses the dial-plate N over a number of degrees corresponding to the amount of current flowing through the wire F. The knife-edge $e$ of the plate E is beveled in the reverse direction to the knife-edge $b$, so that these knife-edges are in close parallel planes, but preferably one slightly above the other, the object of which is to give a more uniform movement to the pointer D, with a steady increase of voltage in the current flowing through the wire F. The positive terminal-post I connects with the abutment G by the wire $i$, and the negative terminal-post I' may connect with the fulcrum J' or the fulcrum-plate B after passing through the resistance T arranged in the back part of the case A. The resistance T is sufficiently great to prevent more than a very small current passing through the wire F. In a voltmeter this resistance is in series with the wire F, whereas in the ammeter it would be in parallel, so that a small current would alone pass through the wire F. Additional external resistance may be employed in connection with this voltmeter to make it act as an ammeter, but in this case the scale-markings would have to be modified.

The fulcrum-block C is provided with a paddle $m$, which works in a glycerin-box M, secured to the case, the glycerin offering a resistance to the paddle and preventing any undue fluctuations or vibrations in the pointer D. The pointer is thus moved with a dead-beat action. It is evident that in place of glycerin any other fluid substance may be employed.

The dial-plate N is preferably made of platinum or some material having but little expansibility. It is connected at one end to a bar P, of copper or other suitable metal or combination of metals—such as German silver, bronze, &c.—the opposite end of which bar is adjustably secured at $p$ to a block O, firmly attached to the case.

The bar P may be a straight bar or made of any other suitable shape, as indicated in dotted lines, Fig. 3, to increase its length to insure the proper expansibility for the purpose of shifting the dial-plate N in a direction transversely to the pointer D. The same atmospheric heat which expands the expansion-wire F also expands the bar P, and simultaneously moves the pointer D and dial-plate N to the right, or vice versa. The scale and pointer will move in the same direction for all normal changes in the atmospheric temperature surrounding the instrument and when no current is flowing, but the instant the current is sent through the wire F the pointer D has an independent movement and travels over the scale upon the dial-plate N.

R is a stationary portion of the dial-plate and supports the mirror Q. This mirror and part R have the weight sustained directly by the case A, so as not to increase the duty of the bar P, though it is evident that the parts N, Q, and R might be formed integral, if so desired, and be moved as a unit. The mirror Q is to enable a proper position of the eye being assumed for accurate reading.

It is immaterial to my invention what the details of construction may be so long as the expansion of a part under atmospheric changes moves the dial in a direction to tend to compensate for corresponding movements of the pointer.

I do not limit myself to the details of construction, as they may be modified in various ways without departing from the principles of my invention.

What I claim as new, and desire to secure by Letters Patent, is—

1. In a measuring instrument for measuring electric currents, the combination of an expansion-wire over which the current is caused to flow, a movable pointer or indicator movable thereby, a dial-plate over which the pointer is moved, a firm support for the dial-plate having a coefficient of expansion relative to that of the expansion-wire whereby normal changes of temperature surrounding the meter will cause the zero-point to be shifted automatically in the same direction as the shifting of the pointer due to the same changes, a cup containing a liquid, and a paddle carried by the pointer or indicator and working in the liquid in the cup for the purpose of making the meter dead-beat in its action.

2. In a measuring instrument for measuring electric currents, the combination of a stationary fulcrum, an indicator or pointer having a fulcrum-block pivoted upon the fulcrum, an expansion-wire connected at one end to an immovable abutment and at the other end to a tension device and having a part acting upon the fulcrum-block of the indicator or pointer, terminals and circuits for causing the current to traverse the expansion-wire, and a dial-plate over which the pointer or indicator moves.

3. In a measuring instrument for measuring electric currents, the combination of a stationary fulcrum, an indicator or pointer having a fulcrum-block pivoted upon the fulcrum, an expansion-wire connected at one end to an immovable abutment and at the other end to a tension device and having a part acting upon the fulcrum-block of the indicator or pointer, terminals and circuits for causing the current to traverse the expansion-wire, a dial-plate over which the pointer or indicator moves, and means to adjust the tension of the expansion-wire.

4. In a measuring instrument for measuring electric currents, the combination of a stationary fulcrum, an indicator or pointer having a fulcrum-block pivoted upon the fulcrum, an expansion-wire connected at one end to an immovable abutment and at the other end to a tension device and having a part acting upon the fulcrum-block of the indicator or pointer, terminals and circuits for causing the current to traverse the expansion-wire, a dial-plate over which the pointer or indicator moves, and means to adjust the tension of the expansion-wire at its connection with the abutment.

5. In a measuring instrument for measuring electric currents, the combination of a stationary fulcrum, an indicator or pointer having a fulcrum-block pivoted upon the fulcrum, an expansion-wire connected at one end to an immovable abutment and at the other end to a tension device and having a part acting upon the fulcrum-block of the indicator or pointer, terminals and circuits for causing the current to traverse the expansion-wire, a dial-plate over which the pointer or indicator moves, means to adjust the tension of the expansion-wire at its connection with the abutment, and means to adjust the tension of the tension device for putting the expansion-wire under any desired degree of tension.

6. In a measuring instrument for measuring electric currents, the combination of a stationary fulcrum, an indicator or pointer having a fulcrum-block pivoted upon the fulcrum, an expansion-wire connected at one end to an abutment and at the other end to a tension device and having a part acting upon the fulcrum-block of the indicator or pointer, terminals and circuits for causing the current to traverse the expansion-wire, a dial-plate over which the pointer or indicator moves, and an expansible support for the dial-plate consisting of an expansible bar connected at one end with the dial-plate and at the other with a part secured to the main frame whereby the dial-plate is moved laterally in the same direction as the pointer or indicator to correspond in direction to the shifting of the pointer or indicator due to variations in temperature of the surrounding atmosphere.

7. In a measuring instrument for measuring electric currents, the combination of a stationary fulcrum, an indicator or pointer having a fulcrum-block pivoted upon the fulcrum, an expansion-wire connected at one end to an abutment and at the other end to a tension device and having a part acting upon the fulcrum-block of the indicator or pointer, terminals and circuits for causing the current to traverse the expansion-wire, a dial-plate over which the pointer or indicator moves, an expansible support for the dial-plate consisting of an expansible bar connected at one end with the dial-plate and at the other with a part secured to the main frame whereby the dial-plate is moved laterally in the same direction as the pointer or indicator to correspond in direction to the shifting of the pointer or indicator due to variations in temperature of the surrounding atmosphere and means to adjust the length of the expansion-bar.

8. In a measuring instrument for measuring electric currents, a pointer and actuating devices therefor, a dial over which the pointer moves, an expansion-wire to move the pointer over which the current to be measured passes, a vessel or cup to contain glycerin or other fluid, and a paddle carried by the pointer moving in the liquid contained in the vessel or cup to make the pointer move with a dead-beat action.

9. In a measuring instrument for measuring electric currents, the combination of a movable pointer, an expansion-wire over which the current to be measured passes adapted to actuate the said pointer, and a dial-plate over which the pointer travels made of two parts one of which is stationary and provided with a mirror and the other of which is movable and carried by a compensating support for moving the zero-point transversely to the length of the pointer.

10. In a measuring instrument for measuring electric currents, the combination of the fulcrum B and movable plate E having the knife-edge $e$, the fulcrum-block C having notches $c\ c'$, the expansion-wire F connected to the plate E, a spring acting upon the plate E to keep the wire F under tension, a rigid abutment G for holding one end of the expansion-wire, a pointer D moved by the fulcrum-block C, and a dial over which it moves.

11. In a measuring instrument for measuring electric currents, the combination of a fixed fulcrum, a pointer having a fulcrum-block pivoted upon said fulcrum but having greater weight upon one side of the fulcrum than on the other so as to move the pointer by the action of gravity, and an expansion-wire over which the current to be measured passes acting upon the fulcrum-block to oppose the action of gravity and permit it to move in accordance with the expansion of said expansion-wire due to the current.

In testimony of which invention I have hereunto set my hand.

R. M. HUNTER.

Witnesses:
ERNEST HOWARD HUNTER,
S. M. WILLIAMSON.